United States Patent [19]

Schneider

[11] Patent Number: 4,561,813
[45] Date of Patent: Dec. 31, 1985

[54] DRILL

[75] Inventor: Lee A. Schneider, Bettendorf, Iowa

[73] Assignee: M. A. Ford Mfg. Co., Inc., Davenport, Iowa

[21] Appl. No.: 501,217

[22] Filed: Jun. 6, 1983

[51] Int. Cl.$^4$ .............................................. B23B 51/02
[52] U.S. Cl. ...................................... 408/230; 408/228
[58] Field of Search ............... 408/199, 226, 227, 228, 408/229, 230, 704, 144, 211, 223, 59

[56] References Cited

U.S. PATENT DOCUMENTS

| | | | |
|---|---|---|---|
| 2,817,983 | 12/1957 | Mossberg | 408/59 |
| 2,897,695 | 8/1959 | Winslow | 408/223 |
| 2,903,921 | 9/1959 | Andreasson | 408/230 |
| 2,936,658 | 5/1960 | Riley | 408/230 |
| 3,387,511 | 6/1968 | Ackart, Sr. et al. | 408/230 |
| 3,400,617 | 9/1968 | Sanborn | 408/223 |
| 3,778,180 | 12/1973 | Ostrom | 408/226 |
| 3,933,075 | 1/1976 | Peterson | 408/230 |
| 4,065,224 | 12/1977 | Siddall | 408/230 |
| 4,080,093 | 3/1978 | Maier | 408/230 |
| 4,116,580 | 9/1978 | Hall et al. | 408/230 |
| 4,222,690 | 9/1980 | Hosoi | 408/230 |
| 4,231,692 | 11/1980 | Brabetz | 408/230 |
| 4,286,677 | 9/1981 | Guex | 408/230 |

FOREIGN PATENT DOCUMENTS

| | | | |
|---|---|---|---|
| 602663 | 8/1934 | Fed. Rep. of Germany | 408/223 |
| 1352808 | 4/1961 | France | 408/211 |
| 3118 | 1/1981 | Japan | 408/144 |
| 859043 | 9/1981 | U.S.S.R. | 408/199 |

OTHER PUBLICATIONS

Megatool–"Point Geometry Specifications", sheet.
Metal Cutting Tool Institute–"Metal Cutting Tool Handbook", Sixth Edition (1969).

Primary Examiner—Gil Weidenfeld
Assistant Examiner—Daniel W. Howell
Attorney, Agent, or Firm—Henderson & Sturm

[57] ABSTRACT

The drill invention relates to forming holes in circuit boards and the like. Smoother holes may be formed faster by reducing tendencies of drills to chip. The drill (11) employs primary and secondary reliefs (28,29) behind cutting lips (27) to provide lesser and greater clearances, thereby strengthening the cutting lips' outer edges. The margins (10) having lengths variable in width (20,21) and variable in helix angle (22,23) facilitate the foregoing.

4 Claims, 5 Drawing Figures

U.S. Patent  Dec. 31, 1985  Sheet 1 of 2  4,561,813 ated to drills. More particularly, this
DRILL

TECHNICAL FIELD

This invention relates to drills. More particularly, this invention relates to twist drills employed for drilling holes in circuit boards or the like.

BACKGROUND ART

Circuit boards generally are comprised of alternating layers of copper or other conducting metal and woven fiberglass-epoxy material. Holes are drilled into these boards to provide passages between the surface and different interior layers. Plating then is done with copper to provide completed circuits between the surface and the interior. A number of drills have been developed for circuit board drilling, eg. U.S. Pat. No. 3,778,180 to Ostrom, No. 4,080,093 to Maier, and No. 4,231,692 to Brabetz et al.

In the past five years or so industry has taken to employing more aggressive drilling practices, increasing both the feed rate of the drill into the workpiece and also increasing the rotational speed of the drill. Industry also has taken to using drills comprised of harder materials. Such drills, usually of a harder grade of tungsten carbide, have the advantages that they stay sharp longer, have a reduced tendency to snap or break in half, and tend to stay straight or resist bending. However, such drills generally are less shock resistant and tend to chip easier, especially under conditions of more aggressive drilling.

In circuit board drilling, chipping, particularly of the outside corner of the cutting edge, is critical because it is that part of the drill which finishes-off, that is smooths, the hole wall surface. Chipping can result in spiral etchings forming in the hole surface which interfere with the coating process and result in imperfect circuits.

Standard drills tend to have a helix angle in the neighborhood of 35° for more efficient removal of workpiece chips up and out of the hole. Because such an angle adjacent the tip of a drill is not the best for cutting, sometimes an angle grind or rake is made in the drill tip to provide a smaller angle better for cutting. This generally has required an additional operation during fabrication of the drill.

The aforementioned problems have not been addressed by the drills developed to date.

DISCLOSURE OF INVENTION

Responding to the needs described above, this invention provides a drill with the land, margin and flute thereof formed such that the helix angle is small adjacent the cutting end and gradually increases to the standard angle away from the cutting end. A primary relief is formed behind the cutting lip and extends from the outside corner part way toward the chisel edge. A secondary relief is formed behind the cutting lip and extends from adjacent the chisel edge over to, and behind, the primary relief. The primary and secondary reliefs provide relatively small and relatively large clearances respectively behind the cutting lip.

It is an object of this invention to provide an improved drill which can better withstand more aggressive drilling practices.

Another object is provision of a drill better suited to circuit board drilling.

Also an object is provision of a drill having an improved cutting end, more particularly with a stronger outer edge more resistant to chipping and better able to handle increased temperatures.

Yet another object of this invention is provision of a drill having an improved margin, land and flute design whereby a stronger cutting angle is maintained while chip removal properties are retained.

It is an object to provide an improved drill which permits selection of harder tungsten-carbide grades for fabrication of the drill and which facilitates thereby the advantages of longer sharpness and increased resistance to bending and snapping-off.

It is an object to provide an improved drill which is fabricated more readily and yet is of sturdier construction capable of achieving the aforementioned objects.

These objects and other features and advantages of this drill invention will become apparent readily upon referring to the following description in conjunction with the appended drawing.

BRIEF DESCRIPTION OF THE DRAWINGS

The drill invention is illustrated in the drawings wherein.

BEST MODE FOR CARRYING OUT THE INVENTION

Figure 1:
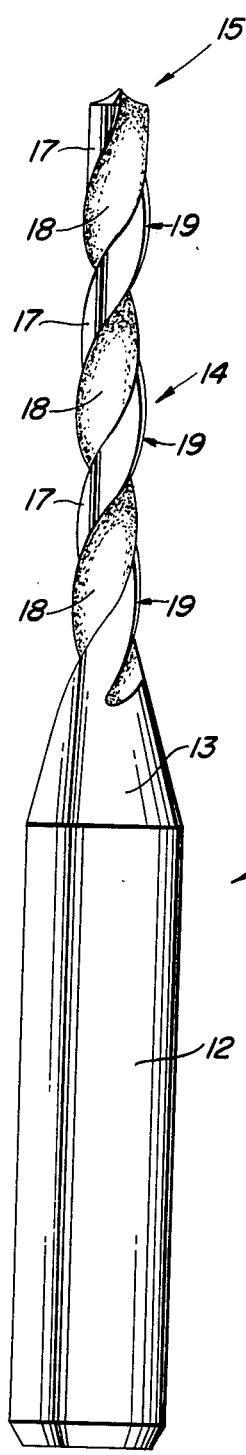
FIG. 1 is a side elevational view of the drill.

The drill invention is shown generally at (11) in FIG. 1. The drill (11) includes a shank (12) contiguous with a tapering neck (13). Extending forward from the small diameter end of neck (13) is a flute length (14) which terminates in a cutting end (15).

Figure 2:
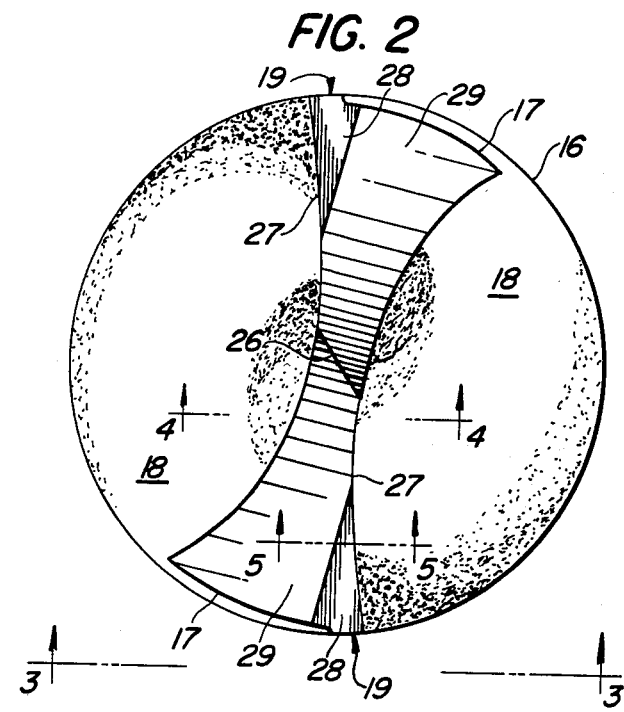
FIG. 2 is an enlarged, end elevational view of the drill's cutting end.

The flute length (14) has a periphery designated (16) in FIG. 2. The length (14) includes, extending from the web or central body portion thereof, lands (17). Flutes (18) are formed between the lands (17). Margins (19) are formed at the rotational leading edges of the lands (17) (the drill (11) as viewed in FIG. 2 rotates counter-clockwise).

Figure 3:
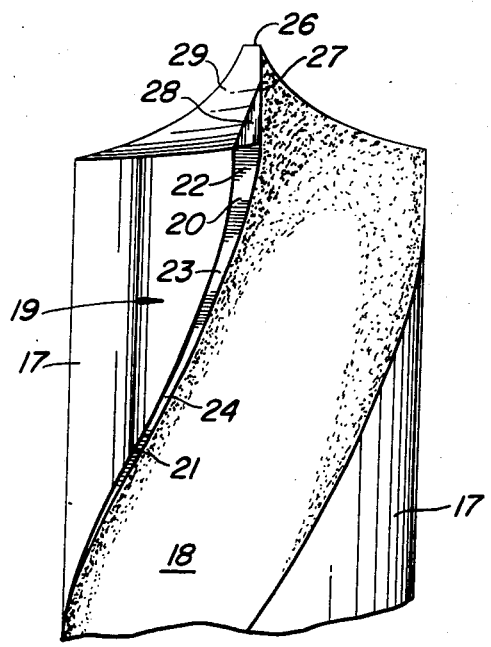
FIG. 3 is an enlarged, fragmentary side elevational view, taken along line 3—3 of FIG. 2, showing cutting end and flute length adjacent thereto.

Referring to FIG. 3, the margins (19) have a relatively greater width in the lengths (20) adjacent the cutting end (15). This width generally is 8 to 10% of the drill (11) diameter (the diameter of periphery (16)). In each margin (19), the length (20) is contiguous with the rest of the margin length (21) which is of a relatively narrower width. The margins (19) also have axial rake lengths (22) immediately adjacent the cutting end (15), intermediate helix blend lengths (23) which extend from lengths (22), and regular helix angle lengths (24) which extend from lengths (23) for the rest of flute length (14). The length (22) forms a rake angle, for example of about 6° to 10° where soft materials such as copper, aluminum, or plastics are being drilled. The length (24) forms a standard helix angle in the area of 35°. The length (23) is a transitional area herein shown as having a smoothly continuous variation in helix angle; however, this length (23) may be comprised of a series of discrete areas having different helix angles between the rake angle and the standard angle. The wider length (20) coincides with the rake length (22) and into the blend length (23).

The cutting end (15) includes a chisel edge (26) at the end of the web. Cutting lips or edges (27) extend from the chisel edge (26) to the periphery (16), meeting the margins (19) at the outer edges of the drill (11). Primary and secondary relief surfaces (28, 29) are formed behind each cutting lip (27).

Figure 4:
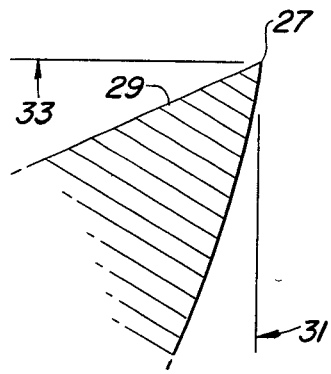
FIG. 4 is an enlarged, fragmentary sectional view along line 4—4 of FIG. 2 showing secondary relief angle.
Figure 5:
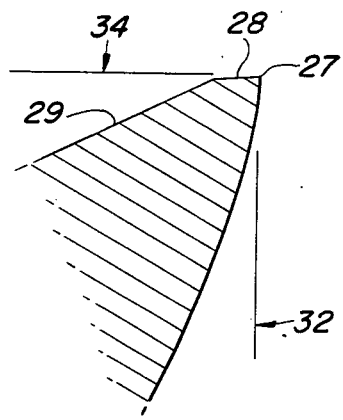
FIG. 5 is an enlarged, fragmentary sectional view along line 5—5 of FIG. 2 showing relief angles.

Referring to FIGS. 2, 4, 5, the primary relief surface (28) meets the cutting lip (27) along a length of the lip (27) extending from the outside edge at the margin (19) partway toward the chisel edge (26). The surface (28) extends back from the lip (27) and over toward the periphery (16), being somewhat pie-shaped. The secondary relief surface (29) meets the chisel edge (26) and also meets the cutting lip (27) along the length thereof extending from the chisel edge (26) partway toward the outside edge to where the primary relief (28) begins. The secondary relief (29) extends back from the chisel edge (26) and lip (27), and back from the primary relief surface (28), and over toward the periphery (16).

In FIGS. 4 and 5, lines (31,32) are parallel to the long axis of drill (11) and are contained in a reference plane which also passes through the cutting lip (27). The cutting end (15) has been sectioned by planes (see lines 5—5 and 4—4 in FIG. 2) normal to the reference plane and intersecting lines (31,32). The views are fragmentary as it is desired to show the angles of the primary and secondary relief surfaces (28,29). The lines (33,34) are contained in the sectioning planes which are normal to the lines (31,32) and therefore to the long axis of the drill (11). The angle which the line of primary relief surface (28) makes with respect to line (34) is about 6° to 8°. The angle which the line of secondary relief surface (29) makes with respect to lines (33,34) is about 25°. In general, the slope of the primary surface (28) back from the cutting lip (27) is shallow; whereas, the slope of the secondary surface (28) is much greater.

The primary and secondary relief surfaces (28,29) are shown herein as being discrete, but clearance could be formed behind the cutting lip (27) such that the surfaces blend smoothly continuously into each other.

In operation, the margins (19) with their wider lengths (20) exercise a piloting function, that is, they aid in keeping the drill (11) centered. The narrower lengths (21) of the margins (19) result in reduced heel drag against the hole surface. The wider lengths (20) also function to strengthen the outer edge of the cutting lip (27) by providing for a thicker cutting edge.

In operation, the outer edges of drill (11) have a much reduced tendency to chip because the cutting lip (27) is thicker due to the smaller clearance at the primary relief surface (28). More material is present to withstand drilling stresses and to carry away heat which is generated at the cutting lip (27). Greater clearance is provided toward the center of the drill (11) by the secondary relief surface (29) to permit the cutting lips (27) to spiral into the material rather than to push straight into it as in the manner of a nail.

Any point along a cutting lip has two motions, the feed rate into the material drilled and the rotational velocity about the drill axis. The sum of these vectors has a resultant angle with respect to the rotational velocity vector which is called the angle of attack. As the feed vector is constant, and the rotational velocity vector decreases from the periphery toward the center of the drill, the angle of attack increases toward the drill center. Proper drilling action requires that the clearance angle be greater than the angle of attack at each point along the cutting lip. Standard drills provide a single continuous clearance surface whose angle is greater than the largest angle of attack anywhere along the cutting lip, and this angle for circuit board drills typically has been about 15°. It can be seen then that the drill (11) of this invention is superior in that greater clearance angles are provided toward the center of the drill where the angle of attack is greater, and lesser clearance is provided toward the outer edge of the cutting lip where the angle of attack is less and where strength is provided for minimizing tendencies to chip.

The industrial applicability of this drill invention is believed to be apparent from the foregoing description. Although a preferred embodiment and modifications thereof have been disclosed herein, it is to be remembered that various alternate constructions can be made thereto without departing from the scope of this invention.

I claim:

1. A drill bit having a shank, a cutting end with a chisel edge, and a flute length connecting the shank and cutting end, the flute length having at least one land forming at least one flute and defining the periphery of the drill, characterized in that,
    cutting lip means is formed on the cutting end and extends from the chisel edge to the periphery; and
    strengthening means is connected to said cutting lip means adjacent the periphery and includes clearance surface means formed on the cutting end, extending back from said cutting lip means, providing a first clearance angle adjacent the periphery, and providing a second clearance angle greater than said first clearance angle adjacent the chisel edge whereby the outer edge of the cutting lip of the drill has a reduced tendency to chip due to its greater thickness, and further includes margin means formed on the land, having a first width length adjacent said cutting lip means, and having a second smaller width length contiguous with said first width length and disposed away from said cutting lip means.

2. A drill bit having a shank, a cutting end with a chisel edge, and a flute length connecting the shank and cutting end, the flute length having at least one land forming at least one flute and defining the periphery of the drill, characterized in that,
    cutting lip means is formed on the cutting end and extends from the chisel edge to the periphery; and
    strengthening means is connected to said cutting lip means adjacent the periphery and includes clearance surface means formed on the cutting end, extending back from said cutting lip means, providing a first clearance angle adjacent the periphery, and providing a second clearance angle greater than said first clearance angle adjacent the chisel edge whereby the outer edge of the cutting lip of the drill has a reduced tendency to chip due to its greater thickness.

3. A drill bit having a shank, a cutting end with a chisel edge, and a flute length connecting the shank and cutting end, the flute length having at least one land forming at least one flute and defining the periphery of the drill, characterized in that,
    cutting lip means is formed on the cutting end and extends from the chisel edge to the periphery; and strengthening means is connected to said cutting lip means adjacent the periphery and includes margin means formed on the land, having a first width length adjacent said cutting lip means, and having a second smaller width length contiguous with said first width length and disposed away from said cutting lip means.

4. The drill bit of claim 3 further characterized in that said margin means includes a rake angle length adjacent said cutting lip means, a helix angle length disposed away from said cutting lip means, and a blend length connecting said rake angle and helix angle lengths.

* * * * *